W. E. COOKE.
ROTARY PLOW.
APPLICATION FILED SEPT. 22, 1910.

1,013,587.

Patented Jan. 2, 1912.

2 SHEETS—SHEET 2.

Witnesses.
A. H. Opsahl.
E. C. Skinkle.

Inventor.
W. E. Cooke.
By his Attorneys
Williamson & Merchant

UNITED STATES PATENT OFFICE.

WILLIAM E. COOKE, OF HARVEY, NORTH DAKOTA.

ROTARY PLOW.

1,013,587. Specification of Letters Patent. Patented Jan. 2, 1912.

Application filed September 22, 1910. Serial No. 583,157.

*To all whom it may concern:*

Be it known that I, WILLIAM E. COOKE, a citizen of the United States, residing at Harvey, in the county of Wells and State of North Dakota, have invented certain new and useful Improvements in Rotary Plows; and I do hereby declare the following to be a full, clear, and exact description of the invention, such as will enable others skilled in the art to which it appertains to make and use the same.

My invention has for its primary object the provision of an improved plow adapted for general use, but especially adapted for use in districts where so-called dry farming is practiced.

To the above ends the invention consists of the novel devices and combinations of devices hereinafter described and defined in the claims.

In the accompanying drawings which illustrate the invention, like characters indicate like parts throughout the several views.

Figure 1:
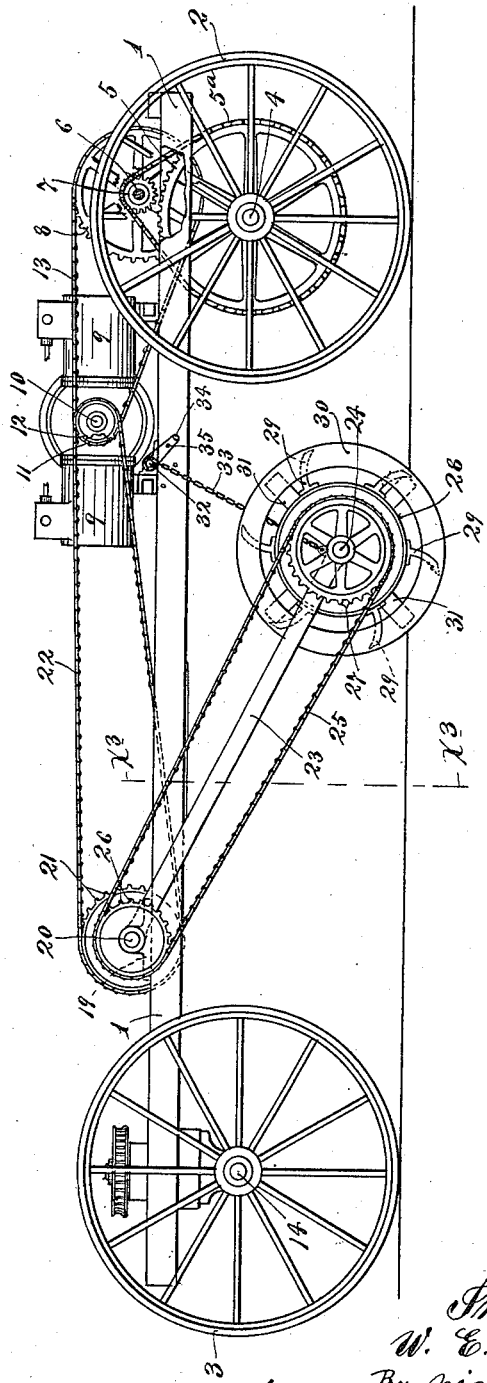
Figure 2:
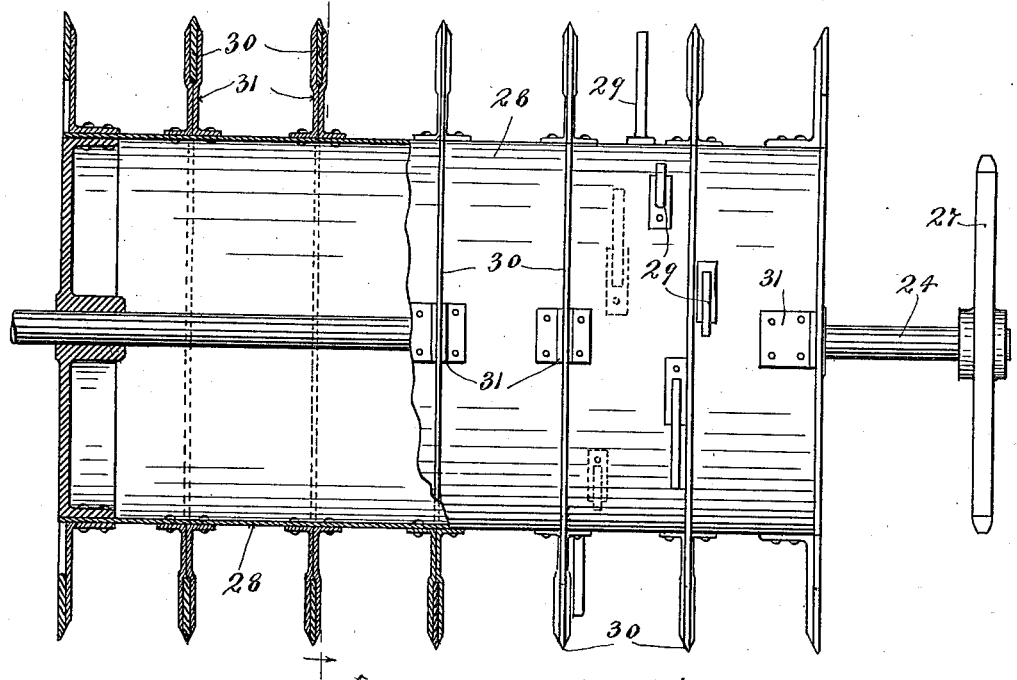
Figure 3:
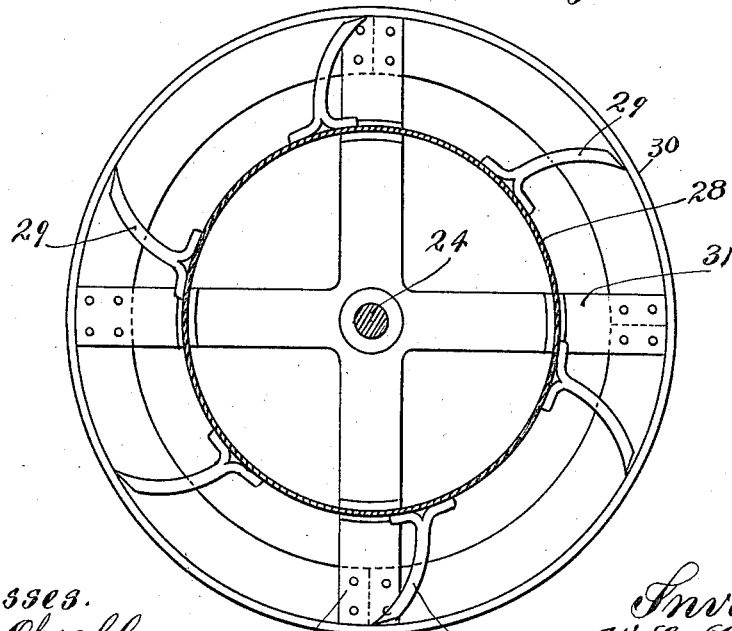

Referring to the drawings,—Figure 1 is a side elevation of the improved plow rake, some parts being sectioned and some parts being broken away; Fig. 2 is a view partly in plan and partly in horizontal section showing the improved rotary plow drum provided with teeth and with so-called guard flanges; and, Fig. 3 is a transverse section taken on the line $x^5$ $x^5$ of Fig. 4.

The tractor or engine driven truck may be of any suitable construction so far as my invention is concerned, and, as shown, the frame work of the truck is indicated as an entirety by the numeral 1, and the front and rear truck wheels are indicated, respectively, by the numerals 2 and 3. As shown, the front wheels 2 are secured to an axle 4 which carries a large sprocket wheel 5. Mounted on the countershaft 6 and located one on each side of the sprocket wheel 7 is a relatively large sprocket wheel 8. A sprocket chain 5ª runs over the alined sprockets 5 and 7.

The numeral 9 indicates an explosive engine mounted on the frame work 1 at the rear of the counter shaft 7 and is provided with a crank shaft 10. The engine crank shaft 10 carries a sprocket 11 and another sprocket 12. A sprocket chain 13 runs over the alined sprockets 8 and 11. The rear wheels 3 are shown as connected to a rear axle 14 that is adapted to be given oscillatory movements to steer the truck, by any suitable means not shown.

Mounted in suitable bearings 19 on the sides of the frame 1 just ahead of the rear wheel 3 is a heavy counter shaft 20 provided with a sprocket 21 over which and the sprocket 12 on the engine crank shaft runs a sprocket chain 22. Pivoted to projecting sleeves of the bearings 19 and extending forward therefrom, is a pair of heavy parallel thrust bars or frame members 23, in the free ends of which, a drum with cylinder shaft 24 is journaled. Sprocket chains 25 run over sprocket wheels 26 on the extreme outer ends of the shaft 20 and over sprockets 27 on the extreme outer ends of the drum shaft 24.

By the connections described, both the drum shaft 24 and the front axle 4 may be driven from the engine 9. In practice, suitable clutch devices will be employed for rendering the axle and drum driving connections independently operative at will, but these clutch devices are not shown, because they constitute no important part of the present invention and may be provided by any mechanic familiar with this class of machinery. The drum shaft 24 carries the drum or cylinder 28 which works between the thrust bars 23. The drum 24 serves as a rotary carrier or support for a multiplicity of plow teeth 29 and a multiplicity of annular guard flanges 30. The guard flanges 30, as shown, are spaced from the drum but rigidly connected thereto by angle brackets 31, and the teeth 29 are arranged in sets between the guard flanges 30. Preferably, the periphery of the guard flanges 30 are quite sharp so that they will readily force their way into the ground under the weight of the cylinder and the thrust bars. The plow teeth 29 are preferably curved forward so that the points will enter the ground and leave the ground in advance of the inner portions of the said teeth. This produces a shearing cut through the ground and causes the earth dug up by the teeth to be turned over as it is thrown rearward by the teeth. Otherwise stated, the subsoil is turned above the top soil and is mixed therewith. This operation will, however, be more fully described later on. The guard flanges 30 extend slightly farther outward than the points of the teeth. Preferably, the sets of plow teeth 29 between the guard flanges 30 are spirally disposed on the drum, or otherwise laterally off-set so that they will cut up the entire ground traversed by the drum.

The guard flanges 30 are located close enough together so that a stone or other obstruction buried in the ground, if of any considerable size, will not pass between the adjacent flanges. These guard flanges, therefore, perform a very important function, to wit: they cause the toothed drum to ride over an embedded rock or similar obstruction and thus prevent the plow teeth from being broken by contact therewith. The toothed drum is driven at a high speed, and hence, if the teeth thereof should strike an embedded stone of any considerable size, they would be broken off or bent. The guard flanges, as stated, prevent this and make it safe to drive the toothed drum at a high rate of speed.

Suitable means should be provided for supporting the toothed drum and its frame 23 at different elevations, depending on the desired depth of cut. As shown, for this purpose, are provided a windlass shaft 32 which is mounted in suitable bearings in the frame 1 and is connected by cables 33 to the sides of the frame 23. The windlass shaft 32 is provided at one end with a crank 34 and it is adapted to be locked in any desired position by a pin 35 inserted into a seat in the side of the frame 1 and engageable with the said crank 34.

Summary of operation: When the toothed drum is properly lowered into engagement with the ground, and the machine is driven forward, said cylinder will, as stated, be rotated at a high rate of speed. Its teeth 29 will dig and cut up the ground and will thoroughly commingle the top and subsoil and will throw the same rearward in a sort of earth shower. The subsoil will be thrown with the points of the teeth, and hence, will be thrown farther rearward with greater force than the top soil. Furthermore, the fine dust which will be stirred up will be caused to settle on the extreme top of the worked ground. This especially adapts the machine to be used in dry farming districts, but the work which it does is desirable for general farming purposes. In fact, the improved plow, so called, by one operation, serves as a plow, harrow, drag and cultivator, and will put all kinds of subsoil in condition for planting.

The most important feature of the invention is found in the novel arrangement of annular guard flanges and plow teeth on the rotary drum for support therefor, whereby the teeth are protected from embedded rocks. This arrangement, I believe, to be broadly new and desire to claim the same broadly. The guard flanges on the drum or rotary member should be quite closely positioned laterally, so that they will protect the drum teeth from embedded rocks of any considerable size or from roots and thus prevent the said teeth from being broken. These guard flanges are required in a machine of this character wherein the toothed drum or rotary member is driven at a high rate of speed, to wit: at a speed high enough to throw the uplifted earth rearward. When the drum is driven at such high speed, the teeth would frequently be broken by engagement with an embedded rock, if the guard flanges were not provided as stated. These guard flanges will cause the toothed drum to ride over an embedded rock of any considerable size or over a root and will raise the points of the teeth out of engagement therewith.

From what has been said, it will, of course, be understood that the improved plow is adapted for use in connection with any kind of a carrying truck and that such a truck is adapted to be driven by any form of engine or motor, or might, in some instances, be drawn by horses, or by an engine located in front of the carrying truck.

What I claim is:

1. In a machine of the kind described, a rotary member provided with a multiplicity of laterally spaced circumferentially extended guard flanges and a multiplicity of sets of circumferentially spaced teeth located between the said flanges with their outer ends terminating radially inward of the outer edges of the said flanges, and the said flanges serving to protect the said teeth, substantially as described.

2. In a machine of the kind described, a rotary member provided with a multiplicity of laterally spaced circumferentially extended guard flanges and a multiplicity of sets of circumferentially spaced teeth located between the said flanges with their outer ends terminating radially inward of the outer edges of the said flanges, and the said flanges serving to protect the said teeth, and means for rotating the said rotary member at a high speed, substantially as described.

In testimony whereof I affix my signature in presence of two witnesses.

WILLIAM E. COOKE.

Witnesses:
  HARRY D. KILGORE,
  BERNICE G. WHEELER.